United States Patent [19]

Lin

[11] Patent Number: 5,760,727
[45] Date of Patent: Jun. 2, 1998

[54] METHOD FOR SYNCHRONIZING SCANNING SPEED AND DATA TRANSMISSION SPEED OF A SCANNER

[75] Inventor: Tom Lin, Taipei Hsien, Taiwan

[73] Assignee: Primax Electronics Ltd., Taipei Hsien, Taiwan

[21] Appl. No.: 703,283

[22] Filed: Aug. 26, 1996

[51] Int. Cl.$^6$ .................................................... H03M 1/12
[52] U.S. Cl. ........................................... 341/155; 348/362
[58] Field of Search .................................. 341/155, 123; 348/362; 11/294

[56] References Cited

U.S. PATENT DOCUMENTS 5,489,772   2/1996   Webb et al. ........................... 348/362

Primary Examiner—Brian K. Young
Attorney, Agent, or Firm—Winston Hsu; Keith Kline

[57] ABSTRACT

A method for synchronizing scanning speed and data transmission speed of a scanner to eliminate a traditional memory buffer is disclosed. The scanner is connected to a host computer and comprises a charge coupled device (CCD) for converting a line image reflected from a document to be scanned into an array of analog signals. The CCD comprises an analog memory array for storing the analog signals. The method comprises the following steps of:

a) outputting an analog signal from the analog memory array;

b) converting the analog signal to a digital signal and transmitting the digital signal to the host computer;

c) waiting until the host computer acknowledges receiving of the digital signal; and d) repeating steps a) to c) until all the analog signals stored in the analog memory array are processed and transmitted to the host computer.

5 Claims, 3 Drawing Sheets

METHOD FOR SYNCHRONIZING SCANNING SPEED AND DATA TRANSMISSION SPEED OF A SCANNER

BACKGROUND OF THE INVENTION

1. Field of the Invention

This invention relates to a scanner, and more particularly, to a method for synchronizing scanning speed and data transmission speed of a scanner.

2. Description of the Prior Art

Image scanners such as flat bed scanners or sheetfed scanners are commonly used in office environment for scanning documents into computers. The image presented on a document is scanned into a scanner line by line and then transmitted to a host computer connected to the scanner. The average data transmission rate of a scanner is dependent on the scanning speed of the scanner and the transmission speed between the scanner and the host computer. Since the scanning speed of a scanner is usually faster than the transmission speed, a memory buffer is used in traditional scanners for matching the difference between these two speeds. FIGS. 1 to 3 will illustrate the details about a traditional scanner.

FIG. 1 shows a function block diagram of a traditional flat bed or sheetfed scanner 10. The scanner 10 comprises a charge coupled device (CCD) 12 for converting a line image reflected from a document to be scanned into an array of analog signals, an amplifier 11 for amplifying each analog signal, an analog-to-digital (A/D) converter 14 for converting the analog signals generated by the CCD 12 into digital signals, a sampling circuit 13 for generating a reference voltage Vrb for the A/D converter 14, a periodic timing generator 16 for generating timing signals to control the CCD 12, a memory buffer 18 for storing the digital signals generated by the A/D converter 14, a motor controller 20 for controlling a step motor 22 for moving the CCD 12 to scan the document in a flat bed scanner or for moving the document in a sheetfed scanner, an interface circuit 24 for transmitting the digital signals stored in the memory buffer 18 to a host computer 26, and a control unit 28 for controlling operations of the scanner 10.

Please refer to FIG. 2. FIG. 2 is a circuit diagram of the CCD 12 shown in FIG. 1. The CCD 12 comprises an optic sensor array 32 for converting a line image reflected from a document to be scanned into an array of analog signals, and an analog memory array 34 which is a shift register for storing the array of analog signals, two amplifiers 36 before and after a sample-and-hold (S/H) circuit 38.

FIG. 3 is a timing diagram of the CCD 12 which shows how the CCD 12 is controlled by the timing signals TG, CLK1, CLK2 and RS generated by the periodic timing generator 16 shown in FIG. 1. The TG signals 40 are used to store the analog signals generated by the optic sensor array 32 into the analog memory array 34 at the end of each predetermined exposure period Te. The CLK1 and CLK2 signals are used to shift the analog memory array 34 one analog signal per cycle. And the RS signals are used to clear the electrons kept in the S/H circuit 38 for next analog signal shifting. The CLK1 and CLK2 signals are continually fed into the analog memory array 34 until all the analog signals stored in it are shifted out.

FIGS. 1 to 3 show that within each step of the step motor 22, one line of the document is scanned by the CCD 12 and the image data generated by the A/D converter 14 are stored in the memory buffer 18. The control unit 28 will then transmit the image data to the host computer 26 through the interface circuit 24. The average data transmission rate of the scanner 10 is dependent on the scanning speed of the scanner 10 and the transmission speed between the scanner 10 and the host computer 26. The memory buffer 18 is used for matching the difference between these two speeds. If the transmission speed is higher than the scanning speed, the scanner 10 can run in full speed until a document is completely scanned. But in most cases, the transmission speed is slower than the scanning speed and image data which can not be transmitted in time are accumulated in the memory buffer 18.

The memory buffer 18 allows the CCD 12 of the scanner 10 keeping on scanning before it is fully filled. Increasing the memory buffer 18 will allow the CCD 12 scanning longer but will also make the system become more complex and expensive. But in general, the size of the memory buffer 18 is irrelevant to the average transmission rate of the scanner 10 because it is restricted by the slower transmission speed between the scanner 10 and the host computer 26.

SUMMARY OF THE INVENTION

It is therefore the goal of the present invention, by overcoming the limits of the prior art, to devise a new method for solving the speed mismatch problem without using the memory buffer mentioned above.

Briefly, in a preferred embodiment, the present invention includes a method for adjusting scanning speed of a scanner which is connected to a host computer, the scanner comprising a charge coupled device (CCD) for converting a line image reflected from a document to be scanned into an array of analog signals. The CCD comprises an analog memory array for storing the analog signals. The method comprises the following steps of:

a) outputting an analog signal from the analog memory array;

b) converting the analog signal to a digital signal and transmitting the digital signal to the host computer;

c) waiting until the host computer acknowledges receiving of the digital signal; and d) repeating steps a) to c) until all the analog signals stored in the analog memory array are processed and transmitted to the host computer.

The CCD further comprises an optic sensor array for converting the line image into the array of analog signals within a predetermined exposure period. And the scanner further comprises a timer for recording the exposure time of the optic sensor array. The method further comprises the following steps of:

e) comparing the exposure time recorded in the timer with the predetermined exposure period;

f) waiting until the exposure time of the optic sensor array is equal to the predetermined exposure period if the compared exposure time is less than the predetermined exposure period;

g) resetting both the optic sensor array and the timer and waiting until the exposure time of the optic sensor array is equal to the predetermined exposure period if the compared exposure time is larger than the predetermined exposure period; and h) storing the array of analog signals generated by the optic sensor array into the analog memory array for next data transmission and then resetting the timer when the exposure time of the optic sensor array is equal to the predetermined exposure period.

It is an advantage of the present invention that the speed mismatch problem is solved by synchronizing the output speed of the analog signals stored in the analog memory array of the CCD and the data transmission speed between the scanner and the host computer. Since each analog signal is converted into a digital signal and transmitted to the host computer one by one and the analog memory array is used as the main storage for keeping all the analog signals generated by the optic sensor array of the CCD, the memory buffer installed in traditional scanners can thus be eliminated.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 4:
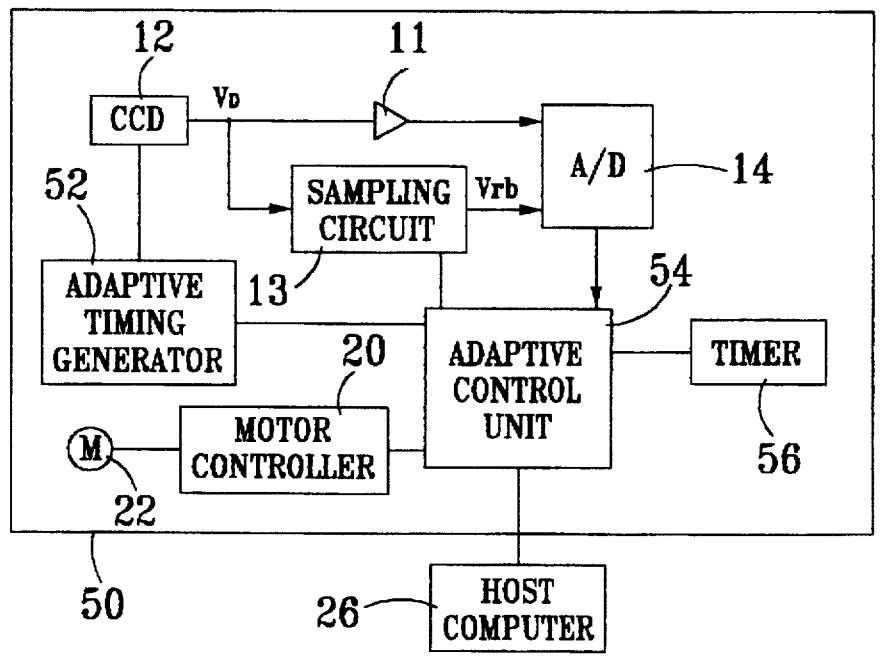
FIG. 4 is a function block diagram of a scanner according to the present invention.

Please refer to FIG. 4. FIG. 4 is a function block diagram of a scanner 50 according to the present invention. The scanner 50 comprises a CCD 12 for converting a line image reflected from a document to be scanned into an array of analog signals, an amplifier 11 for amplifying each analog signal, an A/D converter 14 for converting the analog signals generated by the CCD 12 into digital signals, a sampling circuit 13 for generating a reference voltage Vrb for the A/D converter 14, an adaptive timing generator 52 for generating timing signals to control the CCD 12, a motor controller 20 for controlling a step motor 22 for moving the CCD 12 to scan the document in a flat bed scanner or for moving the document in a sheetfed scanner, a timer 56 for recording the exposure time of the optic sensor array 32, and an adaptive control unit 54 for controlling operations of the scanner 50 and transmitting the digital signals generated by the A/D converter 14 to the host computer 26.

Figure 5:
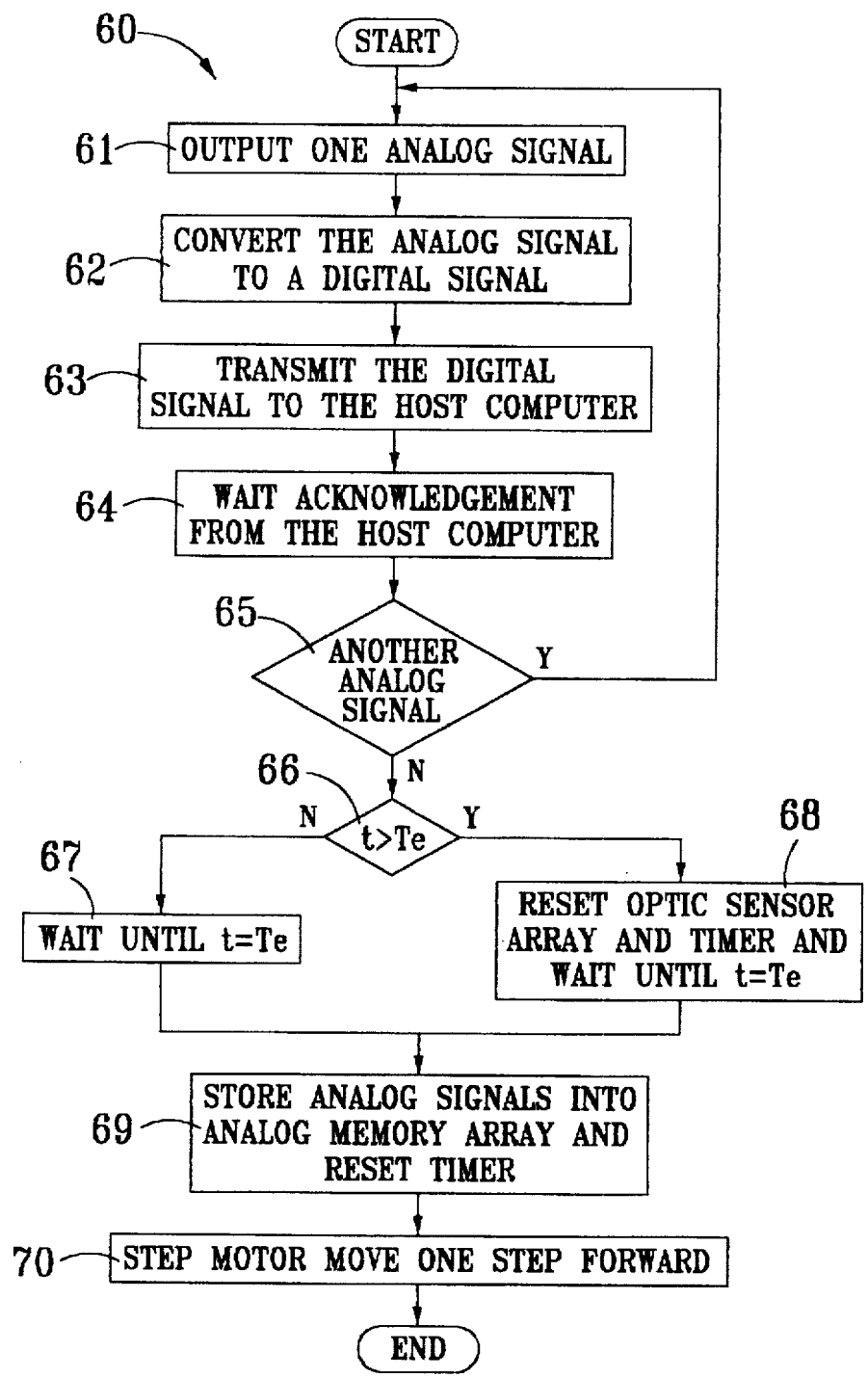
FIG. 5 shows a data transmission and generation process according to the present invention.

FIG. 5 shows a data transmission and generation process 60 according to the present invention. It shows how the analog signals stored in the analog memory array 34 are transmitted to the host computer 26, and how to generate a new array of analog signals after all the analog signals stored in the analog memory array 34 are transmitted. The process 60 comprises the following steps:

step 61 output an analog signal from the analog memory array 34;

step 62 convert the analog signal to a digital signal by using the A/D converter 14;

step 63 transmit the digital signal to the host computer 26;

step 64 wait until the host computer 26 acknowledges receiving of the digital signal;

step 65 repeat steps 61 to 64 until all the analog signals stored in the analog memory array 34 are processed and transmitted to the host computer 26;

step 66 compare the exposure time t recorded in the timer 56 with a predetermined exposure period Te; go to step 66 if the compared exposure time is less than the predetermined exposure period Te; go to step 67 if the compare d exposure time t is larger than the predetermined exposure period Te;

step 67 wait until the exposure time t of the optic sensor array 32 is equal to the predetermined exposure period Te; go to step 69;

step 68 reset the optic sensor array 32 by storing the array of analog signals generated by the optic sensor array 32 into the analog memory array 34, reset the timer 56 (t=0), and wait until the exposure time t of the optic sensor array 32 is equal to the predetermined exposure period Te;

step 69 store the array of analog signals generated by the optic sensor array 32 into the analog memory array 34 for next data transmission and reset the timer 56;

step 70 have the step motor 35 move forward one step.

In process 60 the array of analog signals stored in the analog memory array 34 are transmitted to the host computer 26 one by one in a hand-shaking manner until all the analog signals are transmitted. And then the adaptive control unit 52 will check the exposure time of the new analog signals generated by the optic sensor array 32 to decide whether these new analog signals should be abandoned or not. This is because the voltage values of the analog signals generated by the optic sensor array 32 are dependent on the length of the exposure time of the optic sensor array 32. In order to make sure that accurate measurement can be made, the analog signals generated by the optic sensor array 32 should be stored into the analog memory array 34 when the exposure time of the optic sensor array 32 is equal to a predetermined exposure period Te. After storing the analog signals into the analog memory array 34, the optic sensor array 32 is automatically reset for next exposure.

In process 60, after all the analog signals stored in the analog memory array 34 are transmitted to the host computer 26, if the exposure time t of the new analog signals generated by the optic sensor array 32 is less than the predetermined exposure period Te, the adaptive control unit 54 will wait until the exposure time t is equal to the predetermined exposure period Te and then stored the new analog signals into the analog memory array 34. If the exposure time t of the new analog signals is larger than the predetermined exposure period Te, it means that the new analog signals generated by the optic sensor array 32 are over exposed and thus should be abandoned. In this case the adaptive control unit 54 will have the adaptive timing generator 52 to issue a TG signal to store the new analog signals into the analog memory array 34 which will automatically reset the optic sensor array 32, and the adaptive timing generator 52 will also issue a series of CLK1/CLK2 signals to shift the newly stored analog signals out of the analog memory array 34. After the new exposure period expires, the newly generated analog signals will be stored into the analog memory array 34 and transmitted to the host computer 26. After the new analog signals are stored into the analog memory array 34, the adaptive control unit 54 will have the step motor 35 to move one step forward for scanning the next line image.

Figure 1:
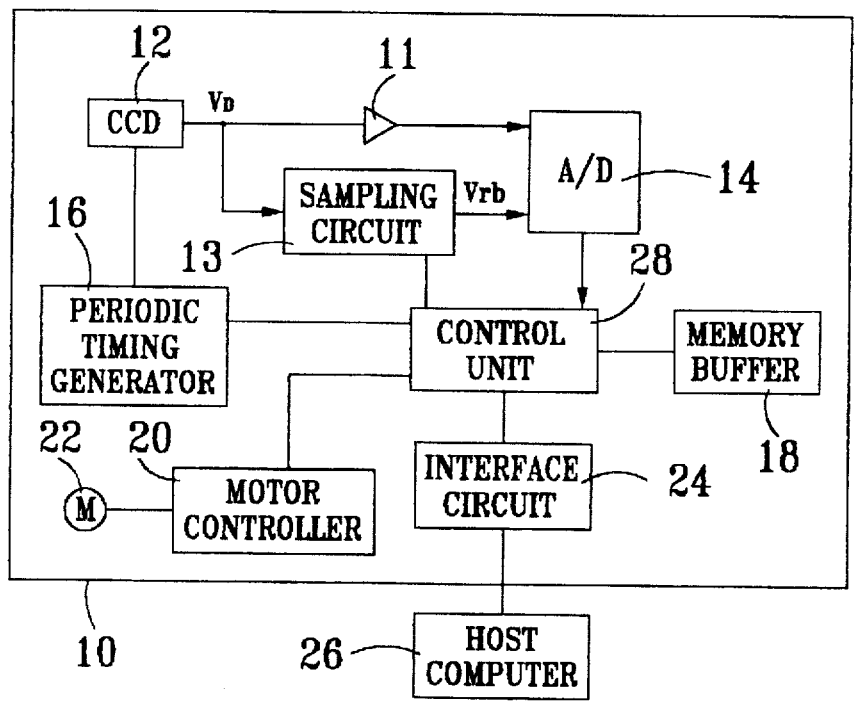
FIG. 1 shows a function block diagram of a traditional flat bed or sheetfed scanner.
Figure 2:
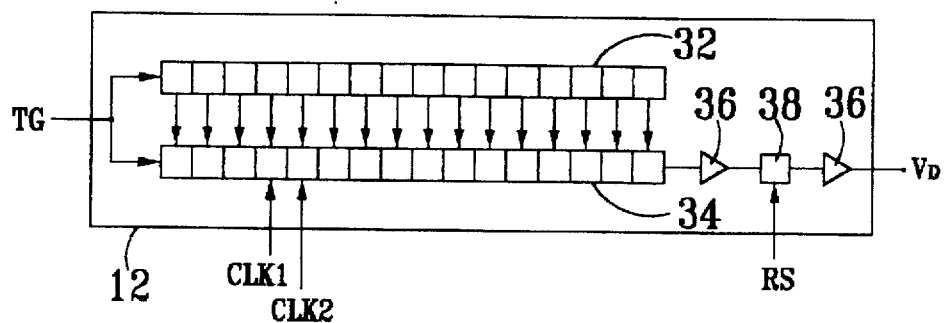
FIG. 2 is a circuit diagram of the CCD shown in FIG. 1.
Figure 3:
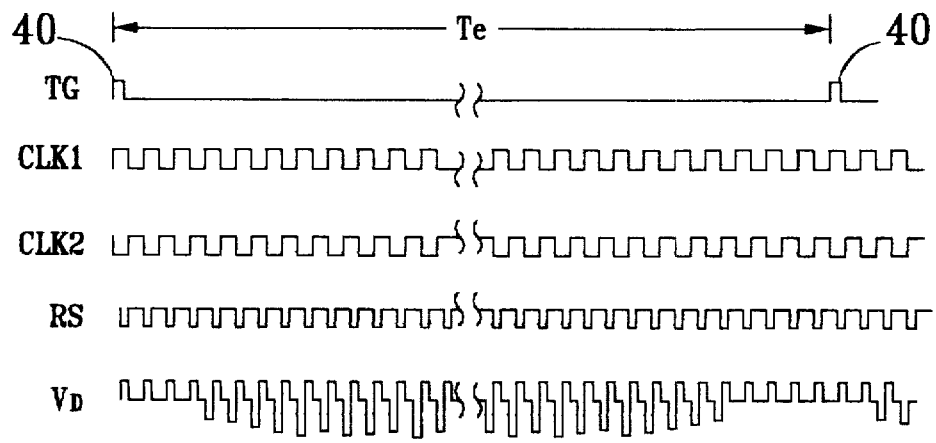
FIG. 3 is a timing diagram of the CCD shown in FIG. 2.

By transmitting the analog signals stored in the analog memory array 34 one by one in a hand-shaking manner to the host computer 26 and also tracing the exposure time of the optic sensor array 32, the scanning speed of the scanner 50 is synchronized with the data transmission speed between the scanner 50 and the host computer 26 by using the process 60. The memory buffer 18 shown in FIG. 1 and its related memory controller can thus be eliminated.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for adjusting scanning speed of a scanner which is connected to a host computer, the scanner comprising a charge coupled device (CCD) for converting a line image reflected from a document to be scanned into an array of analog signals, the CCD comprising an analog memory array for storing the analog signals, the method comprising the following steps of:

a) outputting an analog signal from the analog memory array;

b) converting the analog signal to a digital signal and transmitting the digital signal to the host computer;

c) waiting until the host computer acknowledges receiving of the digital signal; and d) repeating steps a) to c) until all the analog signals stored in the analog memory array are processed and transmitted to the host computer.

2. The method of claim 1 wherein the CCD further comprises an optic sensor array for converting the line image into the array of analog signals within a predetermined exposure period and the scanner further comprises a timer for recording the exposure time of the optic sensor array, the method further comprising the following steps of:

e) comparing the exposure time recorded in the timer with the predetermined exposure period;

f) waiting until the exposure time of the optic sensor array is equal to the predetermined exposure period if the compared exposure time is less than the predetermined exposure period;

g) resetting both the optic sensor array and the timer and waiting until the exposure time of the optic sensor array is equal to the predetermined exposure period if the compared exposure time is larger than the predetermined exposure period; and h) storing the array of analog signals generated by the optic sensor array into the analog memory array for next data transmission and then resetting both the optic sensor array and the timer when the exposure time of the optic sensor array is equal to the predetermined exposure period.

3. An optic scanner for scanning a document comprising:

(1) a charge coupled device (CCD) for converting a line image of the document into an array of analog signals, the CCD further comprising an analog memory array for storing the array of analog signals;

(2) an analog-to-digital (A/D) converter for converting the analog signals into digital signals;

(3) an adaptive timing generator for generating timing signals to control the CCD; and (4) an adaptive control unit for controlling the adaptive timing generator and transmitting the digital signals generated by the A/D converter to the host computer; wherein a first analog signal stored in the analog memory array is outputted to the A/D converter by using the adaptive timing generator, converted into a first digital signal by using the A/D converter, and transmitted to the host computer by the adaptive control unit, and a second analog signal stored in the analog memory array is outputted to the A/D converter and transmitted to the host computer after the adaptive control unit receives an acknowledgement from the host computer about receiving of the first digital signal.

4. The optic scanner of claim 3 wherein the CCD further comprises an optic sensor array for converting the line image into the array of analog signals within a predetermined exposure period and the scanner further comprises a timer for recording the exposure time of the optic sensor array wherein the adaptive control unit compares the exposure time recorded in the timer with the predetermined exposure period after the analog signals stored in the analog memory array are transmitted and waits until the exposure time of the optic sensor array is equal to the predetermined exposure period if the compared exposure time is less than the predetermined exposure period, and stores the array of analog signals generated by the optic sensor array into the analog memory array for next data transmission and then the timer when the exposure time of the optic sensor array is equal to the predetermined exposure period.

5. The optic scanner of claim 3 wherein the CCD further comprises an optic sensor array for converting the line image into the array of analog signals within a predetermined exposure period and the scanner further comprises a timer for recording the exposure time of the optic sensor array wherein the adaptive control unit compares the exposure time recorded in the timer with the predetermined exposure period after the analog signals stored in the analog memory array are transmitted, resets both the optic sensor array and the timer and waits until the exposure time of the optic sensor array is equal to the predetermined exposure period if the compared exposure time is larger than the predetermined exposure period, and stores the array of analog signals generated by the optic sensor array into the analog memory array for next data transmission and then resets the timer when the exposure time of the optic sensor array is equal to the predetermined exposure period.

* * * * *